United States Patent
Hamel et al.

(10) Patent No.: US 10,134,545 B2
(45) Date of Patent: *Nov. 20, 2018

(54) CANTILEVERED PUSH BUTTON

(75) Inventors: Bradley J. Hamel, Sunnyvale, CA (US); Tang Yew Tan, San Francisco, CA (US); Erik Wang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,471

(22) Filed: Sep. 13, 2012

(65) Prior Publication Data

US 2013/0063284 A1   Mar. 14, 2013

Related U.S. Application Data

(63) Continuation of application No. 12/957,228, filed on Nov. 30, 2010, now Pat. No. 8,299,381, which is a continuation of application No. 12/239,102, filed on Sep. 26, 2008, now Pat. No. 7,863,533.

(60) Provisional application No. 61/059,753, filed on Jun. 7, 2008.

(51) Int. Cl.
| | |
|---|---|
| *H01H 13/14* | (2006.01) |
| *H01H 23/30* | (2006.01) |
| *H01H 23/14* | (2006.01) |
| *H04M 1/23* | (2006.01) |

(52) U.S. Cl.
CPC ......... *H01H 23/30* (2013.01); *H01H 23/145* (2013.01); *H04M 1/236* (2013.01)

(58) Field of Classification Search
CPC ........ H01H 13/14; H01H 13/705; H01H 3/12; H01H 3/122; H01H 13/20; H01H 13/50; H01H 23/30; H01H 23/145; H01H 19/635; H01H 23/143
USPC ........ 200/5 R, 6 A, 17 R, 18, 341–345, 339, 200/314, 1 B, 512, 517, 553, 6 R, 302.3, 200/315, 343, 4, 5 A, 518, 552, 557; 341/20, 22; 345/156, 157, 160, 161; 74/471 XY; 455/575.1
See application file for complete search history.

(56) References Cited

U.S. PATENT DOCUMENTS

| | | | | |
|---|---|---|---|---|
| 5,231,386 | A | * | 7/1993 | Brandenburg ......... G05G 9/047 200/5 R |
| 5,329,278 | A | * | 7/1994 | Dombroski ........... G06F 3/0234 200/343 |
| 5,508,479 | A | | 4/1996 | Schooley |
| 5,584,380 | A | | 12/1996 | Naitou |

(Continued)

*Primary Examiner* — Ahmed Saeed
(74) *Attorney, Agent, or Firm* — Dickinson Wright RLLP

(57) ABSTRACT

A cantilevered push button adapted for accepting an input on an electrical or electronic device is disclosed. The button can include an elongated button top component disposed about an exterior surface of an electrical or electronic device such that it is accessible to a user, and having two opposing distal ends associated with separate user inputs. A first fulcrum is located between the first distal end and the midpoint of the elongated button top component, while a second fulcrum is located between the second distal end and the midpoint. A first electrical contact is associated with the first distal end, such that when a user presses on the first distal end, the elongated button top component pivots about the second fulcrum and the first electrical contact is actuated. A second electrical contact is similarly associated with the second distal end and first fulcrum.

20 Claims, 7 Drawing Sheets

(56) References Cited

U.S. PATENT DOCUMENTS

| | | | |
|---|---|---|---|
| 5,902,972 A * | 5/1999 | Nestor | H01H 23/003 |
| | | | 200/1 B |
| 6,239,392 B1 | 5/2001 | Serizawa et al. | |
| 6,246,019 B1 * | 6/2001 | Nakamura et al. | 200/6 A |
| 6,274,826 B1 | 8/2001 | Serizawa et al. | |
| 6,794,982 B2 * | 9/2004 | Inoue et al. | 338/47 |
| 6,844,511 B1 * | 1/2005 | Hsu et al. | 200/6 A |
| 6,961,052 B1 | 11/2005 | Vaziri | |
| 6,967,300 B1 | 11/2005 | Mizuno et al. | |
| 6,995,326 B2 | 2/2006 | Sugimura et al. | |
| 7,180,018 B2 * | 2/2007 | Sekino et al. | 200/5 A |
| 7,259,339 B1 | 8/2007 | Babella | |
| 7,449,650 B2 * | 11/2008 | Richardson et al. | 200/331 |
| 7,863,533 B2 * | 1/2011 | Hamel et al. | 200/339 |
| 8,188,288 B2 * | 5/2012 | Carniato et al. | 546/203 |
| 8,299,381 B2 * | 10/2012 | Hamel et al. | 200/339 |
| 2006/0283692 A1 * | 12/2006 | Barthelet et al. | 200/5 R |
| 2007/0074959 A1 * | 4/2007 | Ikeda | 200/5 R |
| 2008/0060925 A1 * | 3/2008 | Weber | H01H 13/705 |
| | | | 200/341 |
| 2008/0159799 A1 * | 7/2008 | Bender et al. | 400/472 |

* cited by examiner

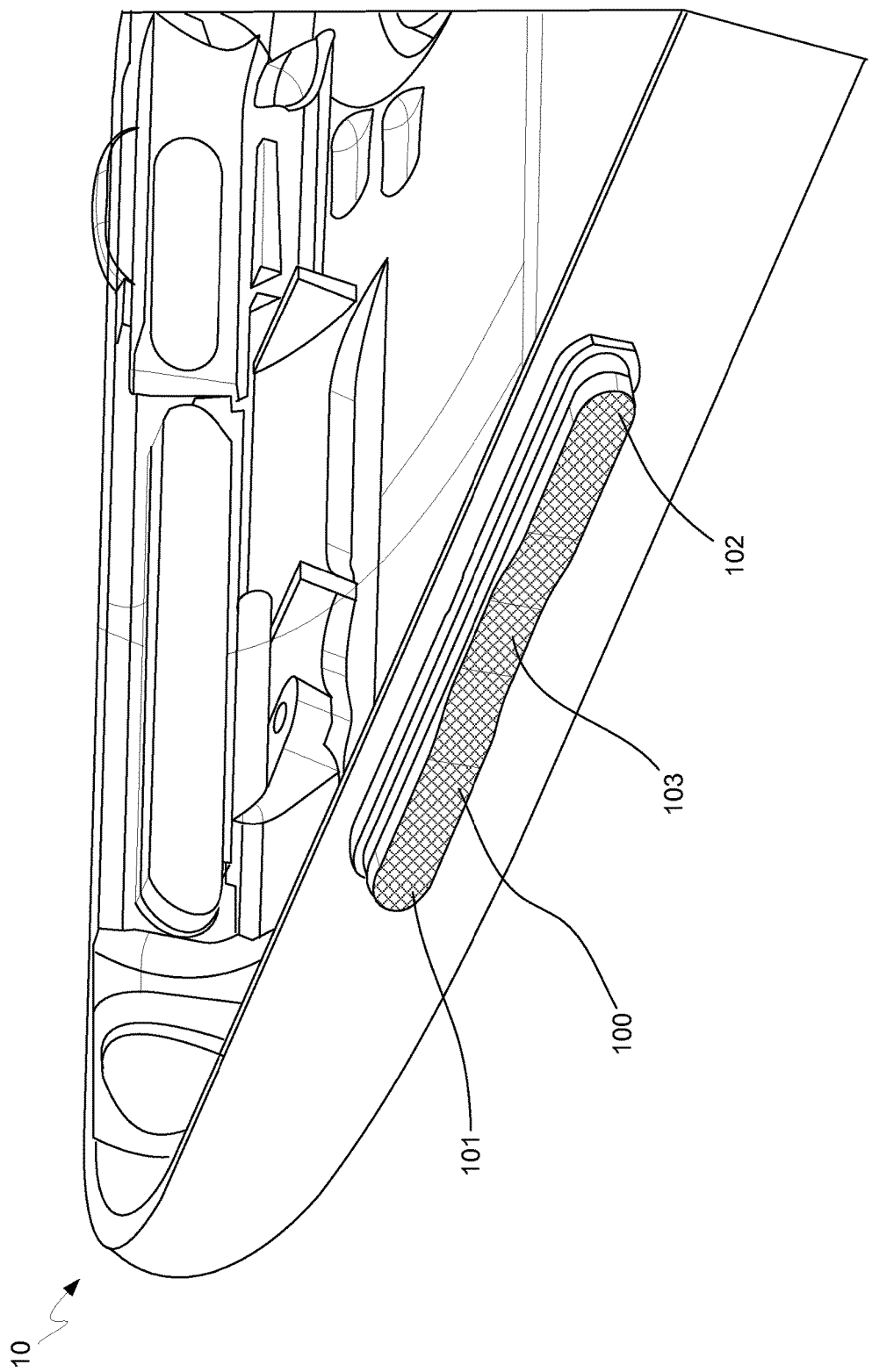

2

CANTILEVERED PUSH BUTTON

CROSS REFERENCE TO RELATED APPLICATIONS

This application claims priority under 35 U.S.C. § 120 to copending and commonly owned U.S. patent application Ser. No. 12/957,228, filed Nov. 30, 2010, and entitled "CANTILEVERED PUSH BUTTON," now U.S. Pat. No. 8,299,381 issued Oct. 30, 2012, and U.S. patent application Ser. No. 12/239,102, filed Sep. 26, 2008, and entitled "CANTILEVERED PUSH BUTTON HAVING MULTIPLE CONTACTS AND FULCRUMS," now U.S. Pat. No. 7,863,533 issued Jan. 4, 2011, which in turn claims priority under 35 U.S.C. § 119(e) to U.S. Provisional Patent Application No. 61/059,753, filed Jun. 7, 2008, and entitled "CANTILEVERED PUSH BUTTON HAVING MULTIPLE CONTACTS AND FULCRUMS," each of which are incorporated herein by reference in their entireties and for all purposes.

TECHNICAL FIELD

The present invention relates generally to push buttons, and more particularly to the use of cantilevered push buttons on electrical or electronic devices.

BACKGROUND

Media players, cellular telephones and numerous other electrical or electronic personal devices or appliances are now ubiquitous. Such devices often require ways of inputting information or commands by a user, with resulting features including touch screens, dials, knobs and push buttons. Such buttons can be part of a keyboard, a 10-key pad, or can be used in isolation, as desired by a designer. One drawback to using push buttons as a means for permitting input can be a cluttered or complex appearance for the overall device where many such buttons are used.

Cantilevered push buttons, also known as seesaw buttons, are one way of providing the functional effect of two buttons while providing a more streamlined and aesthetically pleasing overall appearance. In such an arrangement, a single elongated outer member effectively serves as two different input buttons. When one end is pushed, a first inner electrical contact is actuated, and when the other end is pushed, a second and separate inner electrical contact is made. It is usually not possible to actuate both buttons at the same time with many true cantilevered push buttons.

Such cantilevered or seesaw push buttons typically pivot about a central fulcrum, such that when one end is pushed in by a user to actuate its respective button contact, the other end actually rises upward or away from the rest of the device. Although the actual distances traveled by such cantilevered buttons when actuated can be quite small, it can still be perceived as somewhat less aesthetically appealing to have opposing ends of such cantilevered buttons move away from the device when a particular end is pushed.

In order to compensate for this issue with button ends or other portions moving away from their respective devices, some cantilevered buttons are formed from rubber, soft plastic, or other pliable materials, such that some or all of the cantilevered push button flexes to permit the non-actuated end to be held in place by the device housing or another mechanical stop while the actuated end is pushed inward. Problems with this approach can arise, however, when a metal or other less flexible material is used to construct the actual cantilever portion of the button itself.

While many designs for cantilevered or seesaw push buttons have generally worked well in the past, there is always a desire to provide other cantilever button designs or techniques that can achieve the same or similar objectives in a reliable fashion while allowing for a greater variety of possible materials that may also be more aesthetically pleasing.

SUMMARY

It is an advantage of the present invention to provide metallic or otherwise rigid cantilevered push buttons having multiple electrical contacts that also do not require the non-actuated ends of the buttons to rise when the actuated ends are pushed inward. This can be accomplished at least in part through the use of multiple fulcrums about which the cantilevered push button can pivot, with the fulcrum being determined by which end of the button is pushed.

In various embodiments of the present invention, a cantilevered push button adapted for accepting an input on an electrical or electronic device is provided. This cantilevered push button can include an elongated button top component, a first fulcrum, a second fulcrum, a first electrical contact and a second electrical contact. The elongated button top can have a first distal end associated with a first user input and a second distal end opposite the first distal end and associated with a second user input separate from the first user input. The elongated button top component is preferably disposed about an exterior surface of an electrical or electronic device and is accessible to a user. The first fulcrum can be located at the first distal end or between the first distal end and the midpoint of the elongated button top component, while the second fulcrum can be located at the second distal end or between the second distal end and the midpoint of the elongated button top component. The first electrical contact can be associated with the first distal end of the elongated button top component, while the second electrical contact can be associated with the second distal end of the elongated button top component.

When a user presses on the first distal end of the elongated button top component, then the elongated button top component can pivot about the second fulcrum and the first electrical contact is actuated. Similarly, when a user presses on the second distal end of the elongated button top component, then the elongated button top component pivots about the first fulcrum and the second electrical contact is actuated. In various embodiments, both of the first and second distal ends can be actuated simultaneously by a user during ordinary use of the device, and such simultaneous actuation can result in the entire cantilevered push button being pressed inward toward the device.

In some embodiments of this cantilevered push button, the first fulcrum can be located at the second electrical contact, and/or the second fulcrum can be located at the first electrical contact. Alternatively, the first fulcrum can be located at one distal end and the second fulcrum can be located at another distal end of the cantilevered push button. Although an optimal location for a fulcrum is at a distal end, any location that is significantly far away from the midpoint of the button is preferable. Further, although the fulcrums can be located an equal distance from the midpoint of the button, this is not necessary. Additional fulcrums may also be used, as may be desired for a given design. In particular, one fulcrum per button input is thought to be best. For example, a cantilevered button with four inputs can have four different fulcrums, with one fulcrum for each separate input.

In various embodiments, the elongated button top may be comprised of a substantially rigid material, such as a metal, hard plastic, or other inflexible material. In addition, the first and second electrical contacts can comprise dome button type electrical contacts, which may be preloaded with a positive upward force. The various foregoing features can all be included or only partially included in any desired combination for a given cantilevered push button.

In further embodiments of the present invention, an electrical or electronic device can include a housing adapted to contain one or more internal electrical device components therein, one or more user interface regions, and a cantilevered push button located at one of the user interface regions and adapted for accepting one or more inputs on said electrical device, with the cantilevered push button being any of the cantilevered push buttons described above. In the event of an electronic device, a processor located within the housing may be included, and the user interface region or regions can be in communication with the processor. A plurality of cantilevered push buttons may also be used on such a device, and may be placed at one or multiple user interface regions.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing cantilevered buttons having multiple contacts and fulcrums. These drawings in no way limit any changes in form and detail that may be made to the invention by one skilled in the art without departing from the spirit and scope of the invention.

FIG. 1 illustrates in side perspective view an exemplary cantilevered button along the side of an outer housing for an associated cellular telephone.

DETAILED DESCRIPTION

Figure 2A:
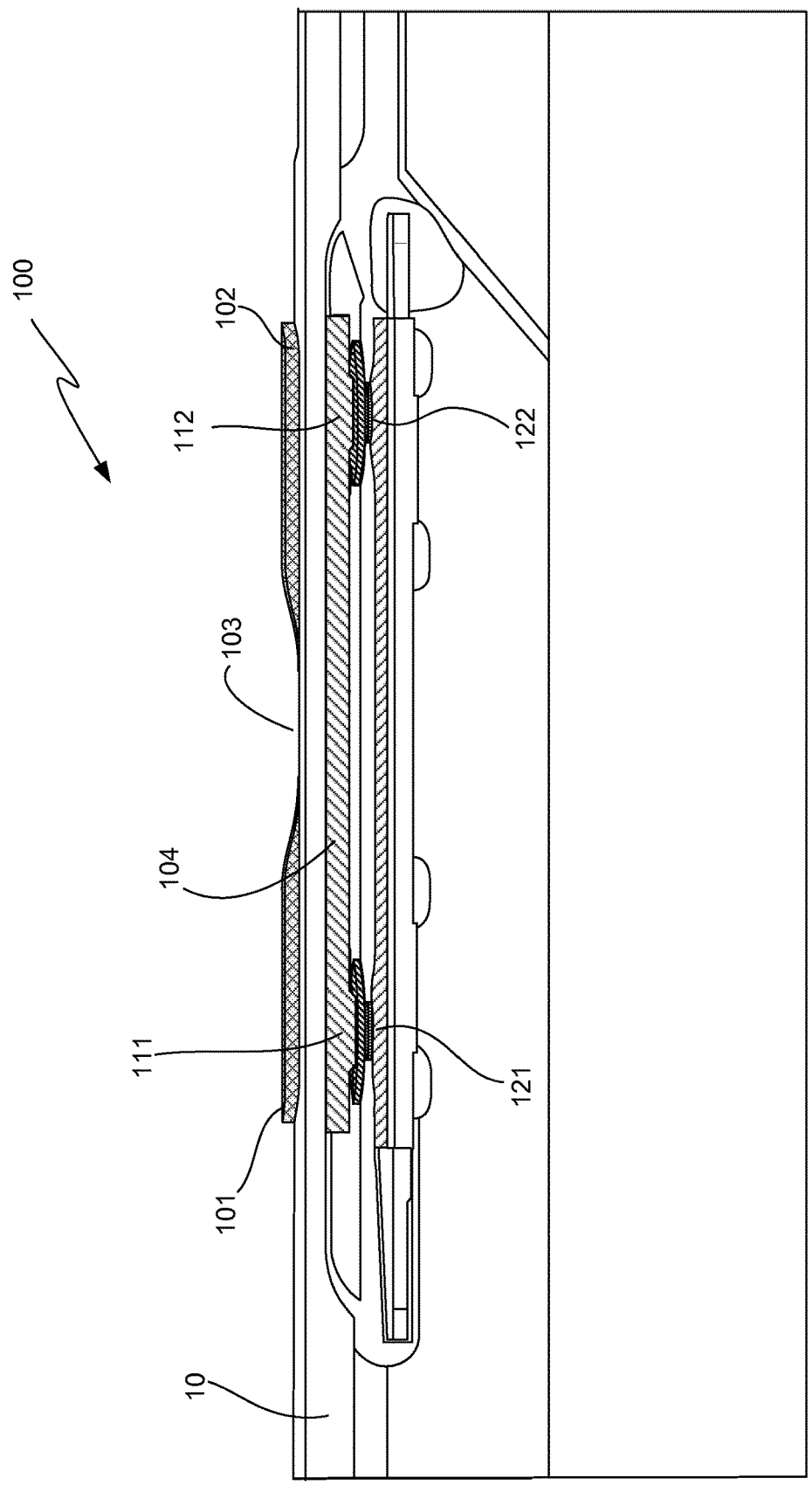
FIG. 2A illustrates in side elevation and partially cutaway view an exemplary cantilevered button according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to the implementation and use of cantilevered push buttons as input mechanisms on electrical devices. Such a device can be, for example, an electronic device, such as an iPod® media player or iPhone® cellular telephone made by Apple Inc., as well as a PDA, handheld game or video game controller, radio, miniature television, keyboard, or any other electrical or electronic device that uses push buttons for user input.

In various embodiments of the present invention, a cantilevered push button having multiple contacts and multiple fulcrums is provided. The cantilevered push button can be adapted such that different fulcrums are used to pivot the button depending upon which end or portion of the button is pressed. In this manner, the overall motion and reactive displacement of the button can be controlled, even where metal or other rigid materials are used to construct the user portion of the button. The overall effect, look and feel can generally be more aesthetically pleasing to the user.

Referring first to FIG. 1, an exemplary cantilevered button along the side of an outer housing for an associated cellular telephone is shown in side perspective view. Cellular telephone housing 10 can include various protrusions, ports and features, as will be readily appreciated. For example, a hole or recess along the side of housing 10 can be made for cantilevered push button 100. Such a button 100 can have a first distal end 101 and a second distal end 102, as well as a midpoint or center 103. Each of distal ends 101, 102 can be adapted to actuate an associated button or electrical contact within the device when they are depressed or otherwise used. Although shown on the side of a cellular telephone, there are many suitable locations for such cantilevered buttons, and numerous other types of devices can feature such a button or buttons, as will be readily appreciated by those skilled in the art.

Moving next to FIG. 2A, an exemplary cantilevered button according to one embodiment of the present invention is illustrates in side elevation and partially cutaway view. As noted above, cantilevered push button 100 can be embedded within a hole or other recess in housing 10. An elongated button top component 100 can include opposing distal ends 101, 102, and a midpoint or center 103. First distal end 101 can be associated with a first internal button or electrical contact 121 inside the device, while second distal end 102 can be associated with a second internal button or electrical contact 122 inside the device. The elongated button top component 100 is generally outside or about the device and exposed to a user, while an internal elongated button base 104 can be attached or otherwise coupled to the elongated button top component. One or more protrusions 111 in the elongated button base component 104 can be adapted to help actuate the electrical contacts 121, as will be readily appreciated.

Figure 2B:
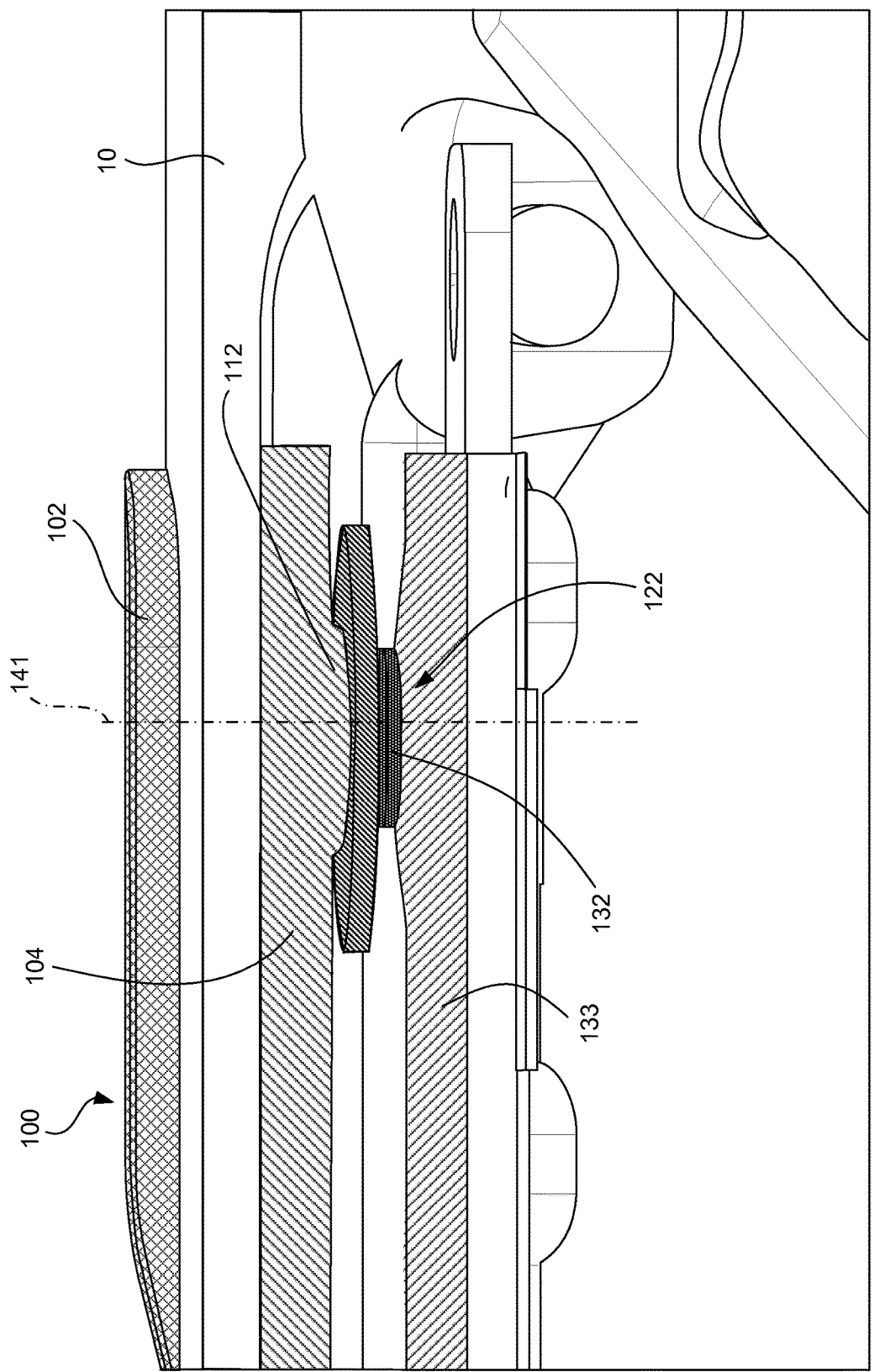
FIG. 2B illustrates in side elevation and partially cutaway view a close-up of one end of the exemplary cantilevered button of FIG. 2A.

FIG. 2B illustrates in side elevation and partially cutaway view a close-up of the right end of the exemplary cantilevered button of FIG. 2A. As shown, distal end 102 is disposed directly above internal button or electrical contact 122. Internal button or electrical contact can be, for example, a pre-loaded dome type button or other suitable electrical contact device, as will be readily appreciated by those skilled in the art. When a user presses downward on or about end 102, the button top component 100 generally depresses downward at distal end 102 and in the direction of electrical contact 122. This forces the portion of button base 104 directly beneath end 102 downward as well, such that protrusion 112 presses on the top 132 of button or electrical contact 122, and this second "button" or electrical contact is thereby actuated. For this process of actuating second button or contact 122 by depressing second distal end 102, the actual fulcrum is at the other end of the cantilevered button and is not shown in FIG. 2B. In the event that the other end of the cantilevered button is depressed to activate the other electrical contact (both not shown in FIG. 2B), then the cantilever pivots about contact 122 (i.e., axis 141). This process is made possible due to the gap between button base 104 and internal structure 133.

Figure 2C:
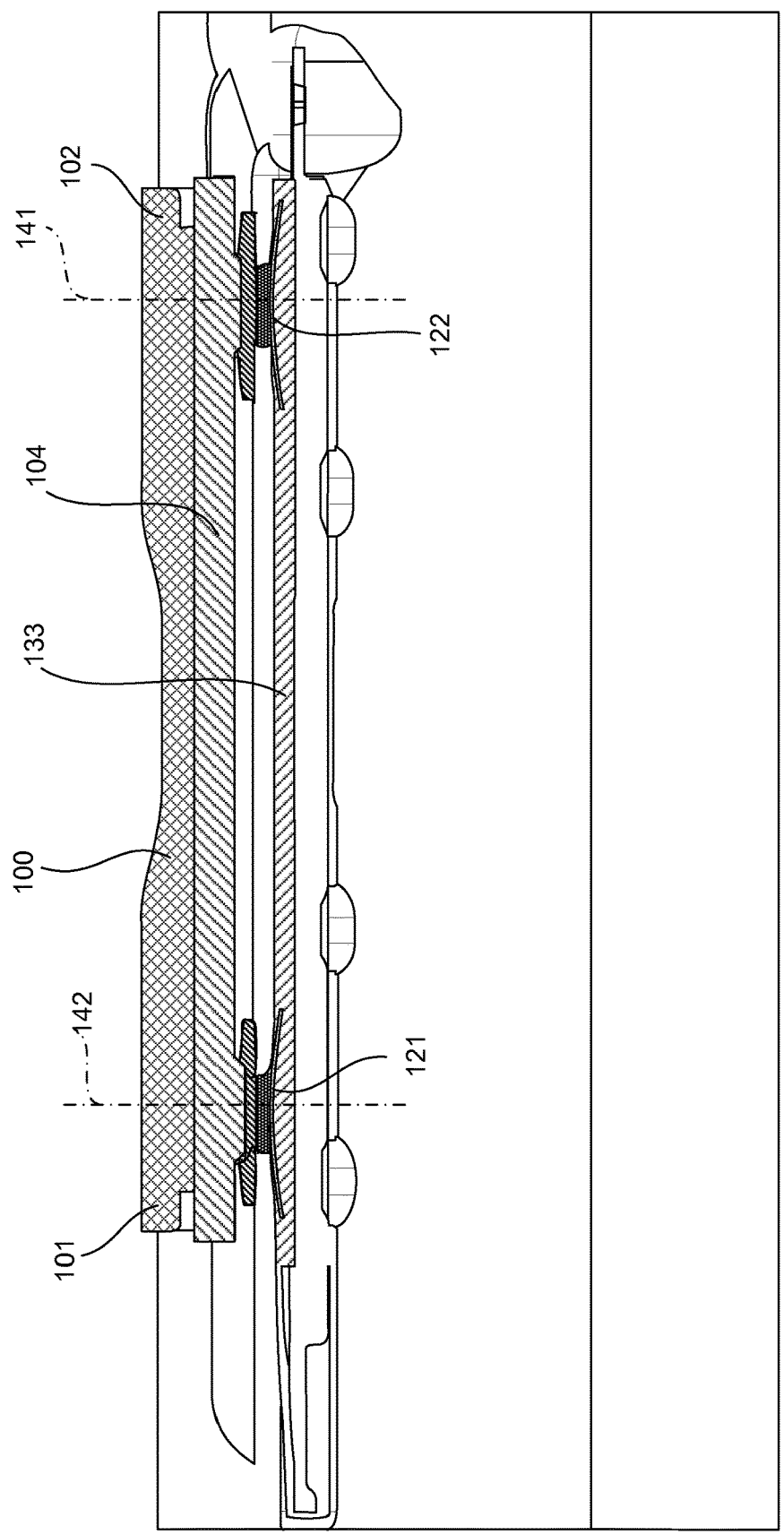
FIG. 2C illustrates in side cross-sectional view the exemplary cantilevered button of FIG. 2A.

FIG. 2C illustrates in side cross-sectional view the exemplary cantilevered button of FIG. 2A. Again, pressing at end 101 actuates contact 121, while pressing at end 102 actuates contact 122. However, the fulcrum is different for each of these different actuations. In the event that end 101 is pressed, then the fulcrum is along contact 122 (i.e., axis 141), while if end 102 is pressed, then the fulcrum is at contact 121 (i.e., axis 142). Since button base 104 is effectively separated from internal structure 133, the effective mechanical contact points between the elongated button top and base and the internal structure are at the internal buttons or electrical contacts 121 and 122. Thus, when a mechanical downward force is applied at one end above one electrical contact, the effective fulcrum is at the other electrical contact at the other end. The result is that multiple fulcrums are used with the overall cantilevered button, such that the opposite end does not perceptively extend away from the device when one end is pushed inward to activate its button.

While not necessary in order for the cantilevered push button to effectively have multiple fulcrums, the spring loaded internal button at each end aids in providing more rigidity and support to the overall device. That is, when end 101 (and thus button or contact 121) is pushed downward, the spring loaded force on contact or button 122 generally disposes end 102 to remain up and steady while button 122 is the fulcrum for the entire elongated button top component 100. Although it is thought that the top of the dome of a spring loaded dome type button makes an excellent location for a fulcrum, other locations are also possible, as will be readily appreciated. In fact, any location at a distal end or between one distal end of the cantilevered push button and its center or midpoint could be suitable for a fulcrum when the other distal end is being pressed or actuated.

As will be readily appreciated, the farther a fulcrum is away from the midpoint or center of the button, the better the effect will be as far as minimal movement of the opposite end when a particular end is pressed. Thus, an optimal location for a fulcrum can actually be at the opposite end of the button from the end that is being pressed or actuated. Conversely, a fulcrum location that is at or close to the midpoint of the button can be less desirable, although not impossible to implement in a particular design. As shown in the exemplary illustrations provided, the fulcrums used are near the distal ends of the cantilevered push button, with the results of such locations being favorable.

Also, it should be noted that the exemplary design illustrated and described herein utilized "soft" fulcrums, in that the fulcrums do provide resistance and are effective in ordinary use, but can be defeated if desired in a particular way. That is, each dome loaded electrical contact provides sufficient resistance to function as a fulcrum when the opposite end is pressed or actuated, but will not provide enough resistance to be a rigid "hard" fulcrum if force is also placed generally above it at the same time. Because a "hard" or permanent central or midpoint fulcrum is not physically present on cantilevered button 100, it is possible to depress both ends 101, 102 to actuate both internal buttons or electrical contacts 121, 122 simultaneously. In such instances, such simultaneous actuation results in the entire cantilevered push button being pressed inward toward its respective electrical or electronic device. This feature provides an additional advantage over traditional or customary cantilever buttons, in that most such devices do not permit both buttons at both ends to be actuated simultaneously. Accordingly, the respective electrical or electronic device can be designed or programmed to accept and act upon simultaneous inputs from multiple inputs on a single cantilevered button.

Figure 3A:
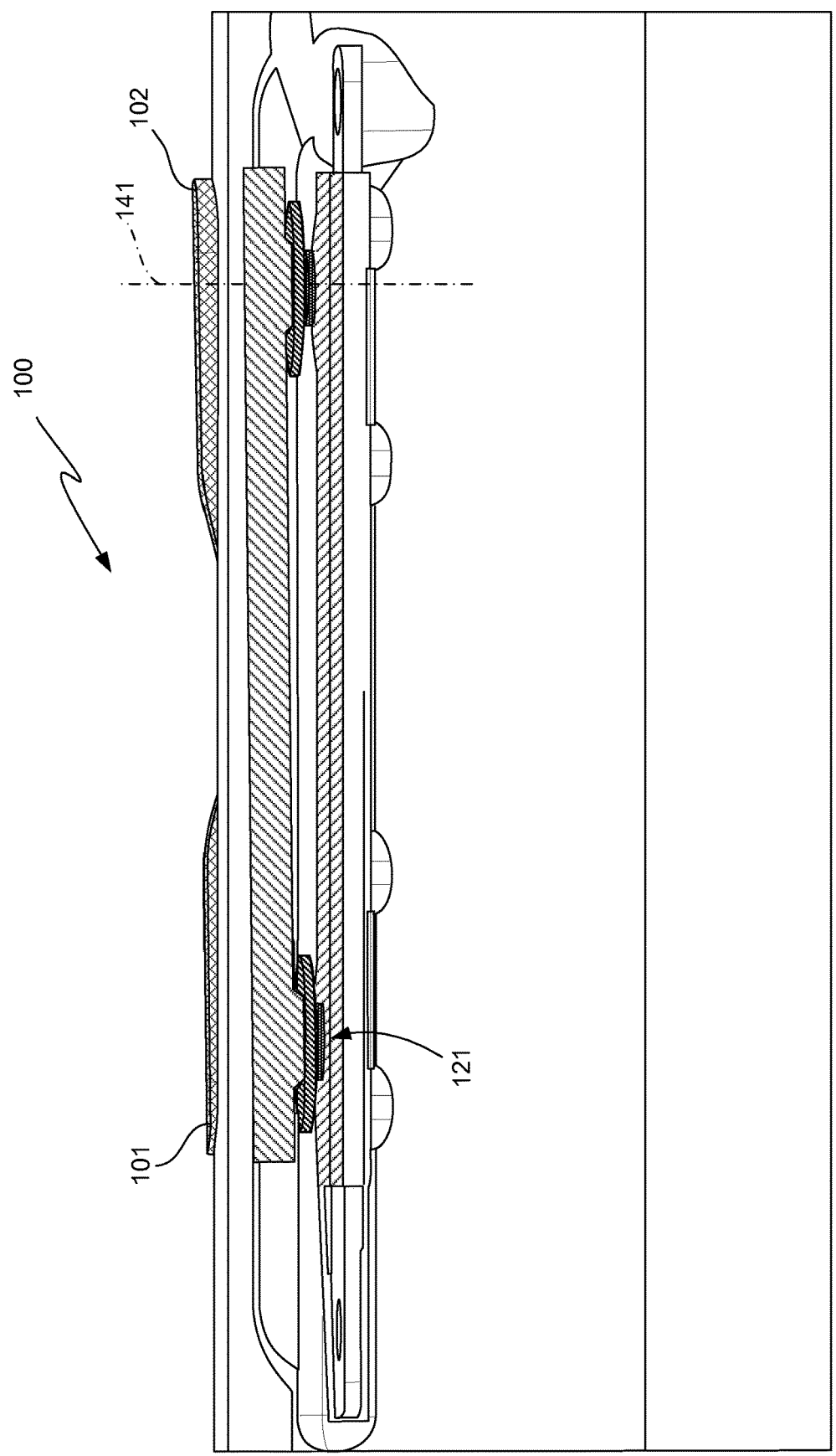
FIG. 3A illustrates in side elevation and partially cutaway view the exemplary cantilevered button of FIG. 2A with the left end actuated according to one embodiment of the present invention.
Figure 3B:
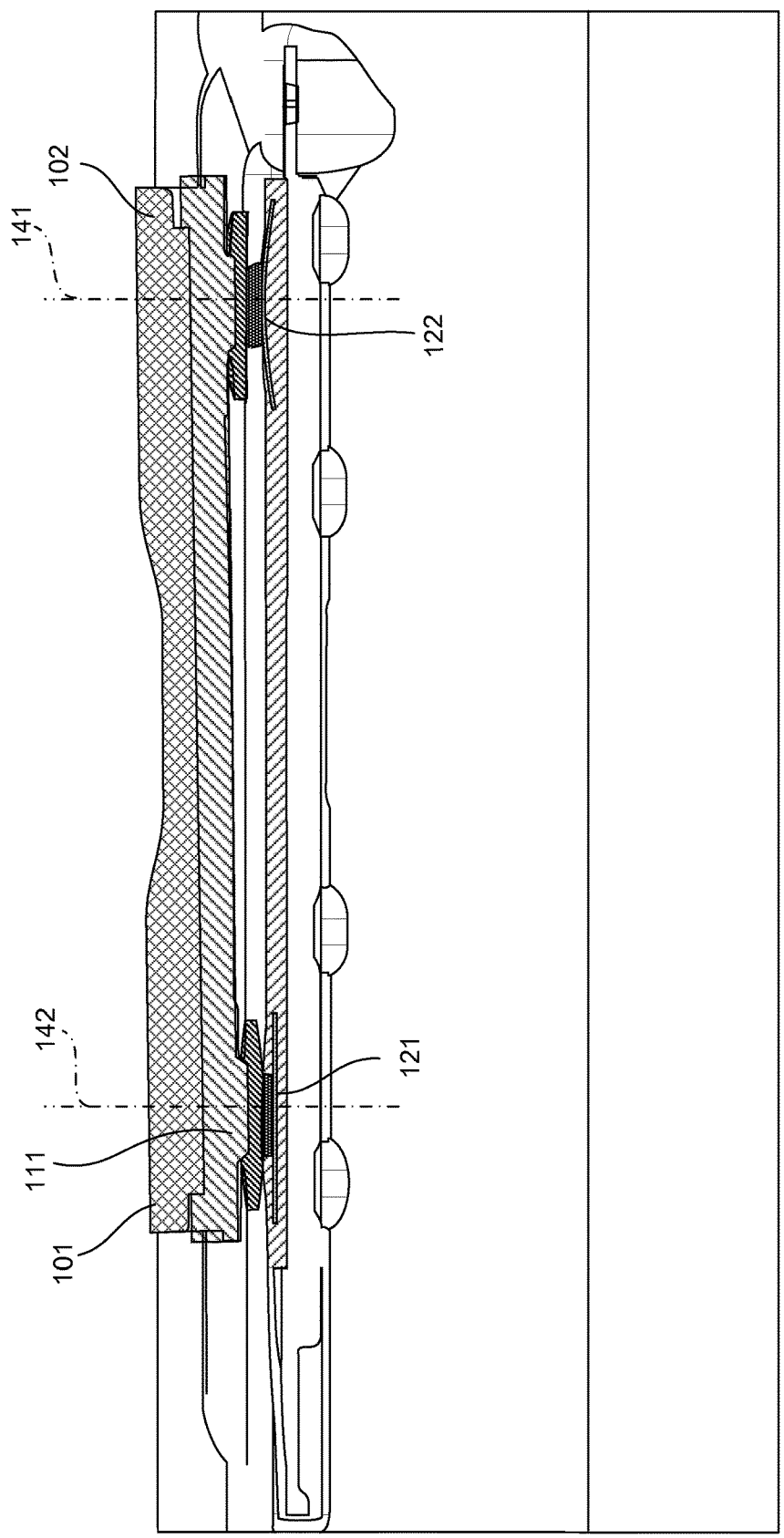
FIG. 3B illustrates in side cross-sectional view the exemplary cantilevered button of FIG. 3A with the left end actuated.

Continuing now to FIGS. 3A and 3B, the exemplary cantilevered button of FIG. 2A is shown with the left end actuated according to one embodiment of the present invention. FIG. 3A depicts a side elevation and partially cutaway view, while FIG. 3B depicts a side cross-sectional view. As illustrated, distal end 101 has been pressed downward such that protrusion 111 has activated button or electrical contact 121 directly below distal end 101. The fulcrum for the entire cantilevered button 100 for this actuation is effectively button or electrical contact 122 at the opposite end, with rotation generally being about a point atop the dome of contact 122 (i.e., along axis 141). Of course, the overall device can be substantially symmetrical in nature, such that the same relationships and results can be had for depressing distal end 102.

Again, because the fulcrum is moved away from the midpoint or center of the cantilevered button, any resulting motion rise of the opposite end is eliminated or substantially reduced when either end is pressed. This is true even where the upper portion of the cantilevered button is a rigid material, such as a metal, hard plastic or other inflexible material. As will be appreciated, such an ability provides designers with added flexibility in their choices for materials and appearances in the design and presentation of cantilevered push buttons that are fully functional and aesthetically pleasing in appearance and use.

It should be noted that although the fulcrums in the examples provided above are generally located an equal distance from the midpoint of the button, this is not absolutely necessary. For example, a particular design might favor one fulcrum being located at a distal end, and another fulcrum being located halfway between the other distal end and the midpoint of the button, or even closer to the midpoint.

Figure 4A:
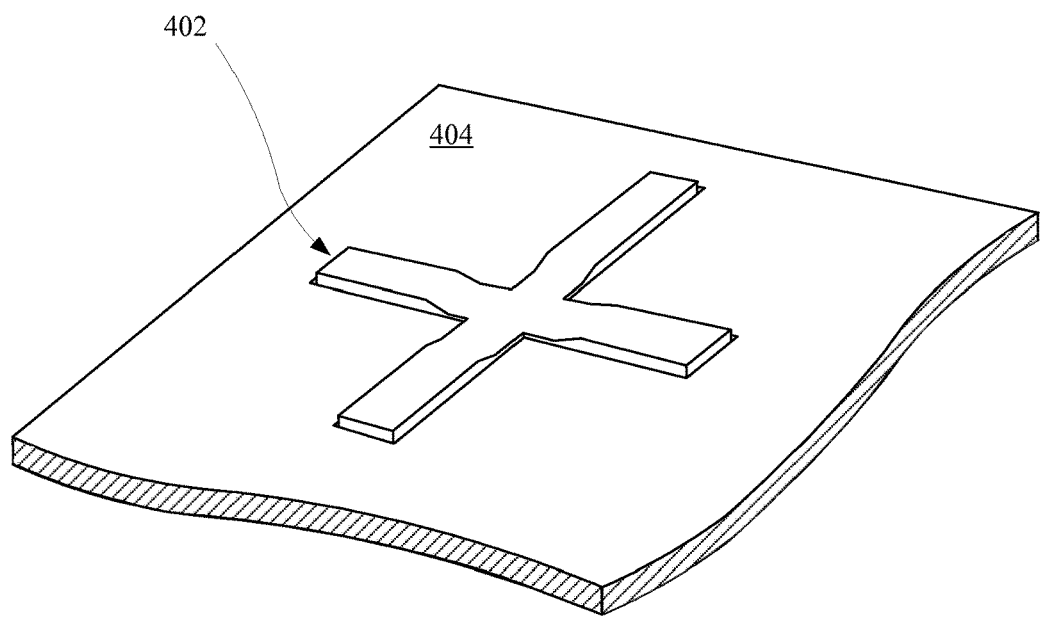
FIGS. 4A-4B illustrate cantilevered push buttons having at least four inputs.
Figure 4B:
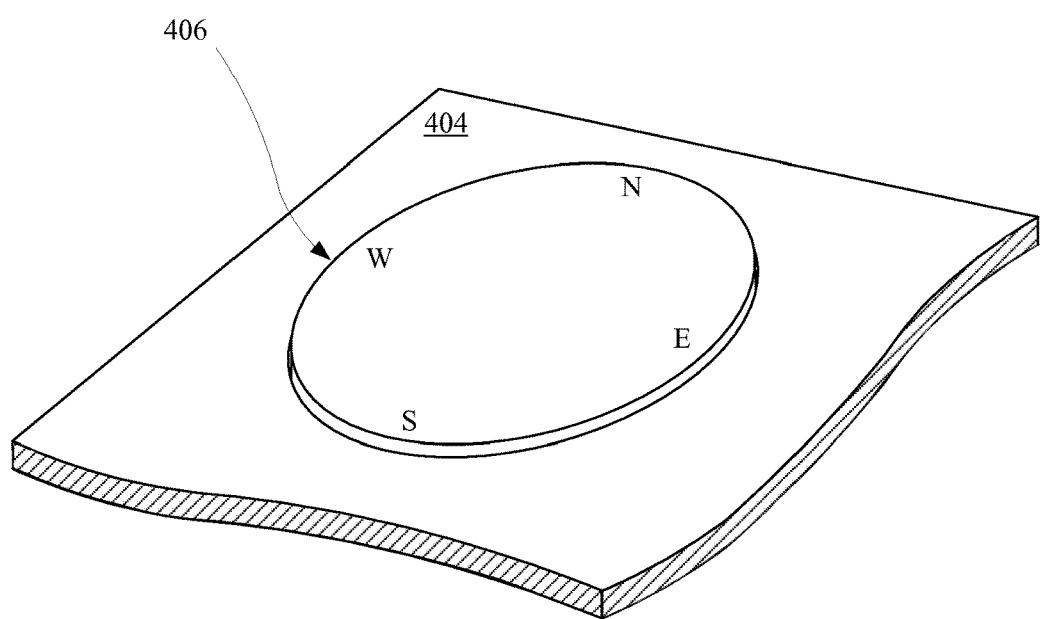

Furthermore, although the foregoing examples all use a relatively simple cantilevered button with only two inputs on opposing ends, more complex buttons with additional fulcrums may also be used, as may be desired for a given design. For example, a four-way cantilevered button having four inputs and four fulcrums may be used, as is illustrated in FIG. 4A. In such a design, button top component 402 may be disposed through housing 404 and may be shaped like a cross and may have a fulcrum that corresponds to each of the four different inputs at each distal end of the cross. Alternatively, as depicted in FIG. 4B button top component 406 could be shaped like a circle, with inputs similarly at the "north," "west," "south" and "east" coordinates of the circle. The use of a simple single user input on such a button (e.g., "north") could result in a pivoting about an opposing fulcrum (e.g., "south"), similar to the two input elongated cantilevered push button in the foregoing examples. In such an embodiment, the simultaneous actuation of two adjacent inputs (e.g., north and east), could result in the simultaneous pivoting about the two opposing fulcrums for those inputs (e.g., south and west). Similar to the foregoing two input button embodiments, a cantilevered push button having four or more inputs could also have "soft" fulcrums, such that the entire button and all inputs could be actuated at once. As will be readily appreciated, further designs and additional inputs for even more complex cantilevered buttons having multiple fulcrums could also be used within the spirit of the present invention.

Although the foregoing invention has been described in detail by way of illustration and example for purposes of clarity and understanding, it will be recognized that the above described invention may be embodied in numerous other specific variations and embodiments without departing from the spirit or essential characteristics of the invention. For example, although many illustrations have pointed to the use of metal as the material for the cantilevered push button, a rigid and inflexible plastic or other material may alternatively be used. Multiple materials may also be used to form the button. Other changes and modifications may be practiced, and it is understood that the invention is not to be limited by the foregoing details, but rather is to be defined by the scope of the appended claims.

What is claimed is:

1. A button system for an electronic device having a housing, the housing having an opening, the button system comprising:
   an elongated button body formed from a first structure that is positioned within the opening, the elongated button body having i) a first distal region, ii) a second distal region that is laterally displaced from the first distal region, and iii) a central region between the first distal region and second distal region,
   a base component in contact with the elongated button body in an unactuated state, the base component formed from a second structure different from the first structure, the base component comprising i) a first protrusion in a location corresponding to the first distal region and ii) a second protrusion in a location corresponding to the second distal region,
   a first depressible electrical actuator that contacts and supports the base component at the first protrusion, and
   a second depressible electrical actuator that contacts and supports the base component at the second protrusion,
   wherein support of the elongated button body is limited to that provided by the first depressible electrical actuator and by the second depressible electrical actuator regardless of an actuation state of the first depressible electrical actuator and by the second depressible electrical actuator.

2. The button system as recited in claim 1, wherein when the first distal region is depressed, the elongated button body pivots about the second depressible actuator.

3. The button system as recited in claim 1, wherein when the second distal region is depressed, the elongated button body pivots about the first depressible actuator.

4. The button system as recited in claim 1, when the first distal region and the second distal region are simultaneously depressed, the first depressible electrical actuator and the second depressible electrical actuator are simultaneously actuated, thereby defining a simultaneous input to the electronic device.

5. The button system as recited in claim 4, wherein:
   the first distal region is associated with a first user input;
   the second distal region is associated with a second user input; and
   the simultaneous input is associated with a third user input.

6. The button system as recited in claim 1, wherein the central region comprises an extended central top surface recessed from a first top surface of the first distal region and from a second top surface of the second distal region, the extended central top surface is flat, and in an un-actuated state the elongated button body is aligned such that the extended central top surface is substantially flush with an external surface of the housing.

7. The button system as recited in claim 6, wherein the first top surface and the second top surface are flat and are substantially parallel to and proud of the external surface of the housing in the un-actuated state.

8. The button system as recited in claim 1, wherein the base component comprises a slot that receives the elongated button body.

9. The button system as recited in claim 1, wherein the button system includes at least four actuation states, the four actuation states are (i) an actuation of the first distal region, (ii) an actuation of the second distal region, (iii) a simultaneous actuation of both the first and second distal regions, and (iv) an un-actuated state.

10. A button system, comprising a support layer;
   an elongated cantilevered button body comprising a midpoint, the elongated cantilevered button body having i) a first distal region, ii) a second distal region opposite the first distal region, and iii) a central region centered about the midpoint, the central region separating the first distal region and second distal region;
   a unitary base component coupled to the elongated button body, the unitary base component moving with the elongated cantilevered button body when elongated cantilevered button body is actuated, the unitary base component comprising i) a first protrusion in a location corresponding to the first distal region and ii) a second protrusion in a location corresponding to the second distal region;
   a first spring loaded electrical actuator disposed on the support layer, wherein the first spring loaded electrical actuator is in contact with the unitary base component at the first protrusion; and
   a second spring loaded electrical actuator disposed on the support layer, wherein the second spring loaded electrical actuator is in contact with the unitary base component at the second protrusion,
   wherein, regardless of an actuation state of the elongated cantilevered button body, direct support of the elongated cantilevered button body and the unitary base component is limited maintained by the first spring loaded electrical actuator at the first protrusion and by the second spring loaded electrical actuator at the second protrusion, and wherein each of the first protrusion and of the second protrusion corresponds to a respective fulcrum about which the elongated cantilevered button body is capable of movement; and wherein when the first distal region moves, the midpoint of the elongated cantilevered button body is free to move along a first arc centered around the second protrusion, and wherein when the second distal region moves, the midpoint of the elongated cantilevered button body is free to move along a second arc centered around the first protrusion, wherein the second arc and the first arc are opposite each other.

11. The button system as recited in claim 10, wherein when the first distal region and the second distal region are simultaneously depressed, the first spring loaded electrical actuator and the second spring loaded electrical actuator are simultaneously actuated, thereby defining a simultaneous input.

12. The button system as recited in claim 11, wherein:
the first distal region is associated with a first user input;
the second distal region is associated with a second user input; and
the simultaneous input is associated with a third user input.

13. The button system as recited in claim 10, wherein the central region comprises an extended central top surface recessed from a first top surface of the first distal region and from a second top surface of the second distal region, the extended central top surface is flat, and in an un-actuated state the elongated cantilevered button body is aligned such that the extended central top surface is substantially flush with an external surface of a housing.

14. The button system as recited in claim 10, wherein the unitary base component comprises a slot that receives the elongated button body.

15. The button system as recited in claim 10, wherein the button system includes at least four actuation states, the four actuation states are (i) an actuation of the first distal region, (ii) an actuation of the second distal region, (iii) a simultaneous actuation of both the first and second distal regions, and (iv) an un-actuated state.

16. A two-fulcrum button system comprising:
an elongated cantilevered button body being characterized as having a first distal region and a second distal region and having a top portion with a top surface accessible to a user;
a base portion having a first surface that includes a slot that receives the elongated cantilevered button body, the base portion further comprising a second surface opposite the first surface, the second surface having a first protrusion and a second protrusion;
a first electrical contact that contacts the second surface of the base portion at the first protrusion in accordance with a first axis, the first axis having a first point capable of acting as a first fulcrum for the elongated cantilevered button body when the second distal region is depressed; and
a second electrical contact that contacts the second surface of the base portion at the second protrusion in accordance with a second axis, the second axis having a second point capable of acting as a second fulcrum for the elongated cantilevered button body when the first distal region is depressed,
wherein a first depression of the first distal region activates the first electrical contact corresponding to a first actuation state, a second depression of the second distal region activates the second electrical contact corresponding to a second actuation state, and otherwise, no depression of the first distal region and the second distal regions corresponds to an inactivated state, and
wherein, regardless of the first actuation state, the second actuation state, or the inactivated state, the first electrical contact is engaged with the first protrusion and the second electrical contact is engaged with the second protrusion.

17. The two-fulcrum button system as recited in claim 16, when the first distal region and the second distal region are simultaneously depressed, the first electrical contact and the second electrical contact are simultaneously actuated, thereby defining a simultaneous input.

18. The two-fulcrum button system as recited in claim 16, wherein the top portion having an extended central top surface recessed from a first top surface of the first distal region and from a second top surface of the second distal region, the extended central top surface is flat, and in an un-actuated state the elongated cantilevered button body is aligned such that the extended central top surface is substantially flush with an external surface of a housing.

19. The two-fulcrum button system as recited in claim 18, wherein the first top surface and the second top surface are flat and are substantially parallel to and proud of the external surface of the housing in the un-actuated state.

20. The two-fulcrum button system as recited in claim 16, wherein the two-fulcrum button system includes at least four actuation states, the four actuation states are (i) an actuation of the first distal region, (ii) an actuation of the second distal region, (iii) a simultaneous actuation of both the first and second distal regions, and (iv) an un-actuated state.

* * * * *

UNITED STATES PATENT AND TRADEMARK OFFICE
CERTIFICATE OF CORRECTION

PATENT NO. : 10,134,545 B2  
APPLICATION NO. : 13/615471  
DATED : November 20, 2018  
INVENTOR(S) : Hamel et al.

Page 1 of 1

It is certified that error appears in the above-identified patent and that said Letters Patent is hereby corrected as shown below:

In the Claims

In Claim 10, at Column 8, Line 37: "A button system, comprising a support layer;" should read as follows:
-- A button system, comprising:
    a support layer; --.

Signed and Sealed this  
Twenty-sixth Day of November, 2019

Andrei Iancu  
*Director of the United States Patent and Trademark Office*